(12) United States Patent
Ellis et al.

(10) Patent No.: US 6,229,235 B1
(45) Date of Patent: May 8, 2001

(54) ACCESSORIES TRAY FOR AN ELECTRIC MOTOR

(75) Inventors: Robert E. Ellis, Grabill; L. Edwin Fisher, Ft. Wayne; Marc D. Pape, Ft. Wayne; James V. Yu, Ft. Wayne, all of IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/237,265

(22) Filed: Jan. 25, 1999

(51) Int. Cl.[7] .............................. H02K 5/00; H02K 11/00
(52) U.S. Cl. ........................................ 310/89; 310/68 E
(58) Field of Search ........................... 310/89, 68 E, 310/85, 68 R, 66; 361/600, 797; 206/560; 211/133.6, 86.01

(56) References Cited

U.S. PATENT DOCUMENTS

| | | | |
|---|---|---|---|
| 4,958,096 | * | 9/1990 | Kachuk .............................. 310/68 E |
| 5,220,226 | * | 6/1993 | Long et al. ............................ 310/89 |
| 5,780,946 | * | 7/1998 | Nakamura et al. .................... 310/58 |

* cited by examiner

Primary Examiner—Nestor Ramirez
Assistant Examiner—Guillermo Perez
(74) Attorney, Agent, or Firm—Carl B. Horton, Esq.; Damian Wasserbauer, Esq.; Armstrong Teasdale, LLP

(57) ABSTRACT

An electric motor assembly including an integral tray for placement of tools and accessories is disclosed. The tray includes a plurality of compartments having a variety of shapes and sizes. A first portion of the tray is connected to a cover and the tray extends from the cover along a portion of the electric motor. A second portion of the tray is perpendicular to the cover and includes an open top which allows tools and accessories to be placed within the compartments.

21 Claims, 2 Drawing Sheets

ACCESSORIES TRAY FOR AN ELECTRIC MOTOR

BACKGROUND OF THE INVENTION

This invention relates generally to electric motors and, more particularly, to a tray mounted to the motor for storage.

Electric motors typically include a housing, a stator, and a rotor assembly. The housing includes a shell and two end shields and houses at least a portion of a rotor assembly. The rotor assembly includes a rotor core and a rotor shaft extending through the core. Some motor types and configurations include components to modify the motor operating characteristics for particular applications. Examples of such motor types are resistance start, reactor start, capacitor start, permanent split capacitor, and capacitor start-capacitor run motors. These different types of motors are characterized by different speed-torque characteristics and may be designed to provide different theoretical maximum efficiencies. For some applications, particularly those where high starting torque is required as in compressor motors, part of the windings in the motor serve as auxiliary or starting windings which are energized during initial excitation of the motor, but which are de-energized as the motor comes up to a predetermined speed. De-energization of such windings is often accomplished by a centrifugal switch, or other appropriate device.

Electrical components at least sometimes used in such motor configurations include, in addition to the centrifugal switch, at least one capacitor and an overload. These components can be mounted to one of the motor end shields to facilitate access thereto. To provide protection from moisture, dust, and other contaminants, such components are often mounted in a closed "control compartment" in which the subject electrical components are housed.

Compressor motors typically utilized in today's consumer markets are used with a variety of fittings and accessory tools to perform various useful functions. Typically these parts will be purchased separately and will vary based on the application need of the end user. These parts and accessories can be lost or misplaced as a result of not having a convenient storage space. Additionally, power devices such as spray guns, impact wrenches, and drives can be damaged without a proper place to rest or store when not being utilized.

Accordingly, it would be desirable to provide an electric motor including a storage compartment for accessories or parts. It would also be desirable to provide easy access to the parts while reducing the possibility of the parts becoming lost or misplaced.

BRIEF SUMMARY OF THE INVENTION

These and other objects may be attained by an electric motor assembly including a tray for placement of tools and accessories. The tray can include a plurality of compartments having a variety of shapes and sizes.

More specifically, a first portion of the tray is connected to a cover and the tray extends from the cover along a portion of the electric motor. A second portion of the tray is attached to a shell of the electric motor to provide stability to the tray. The tray has an open top which allows tools and accessories to be placed within the compartments. The cover is connected to an end shield of the motor and forms an enclosure therewith. The enclosure houses one or more electrical components of the motor and prevents contaminants from contacting the components.

The electric motor assembly includes a tray for tools and accessories that is convenient and cost effective. The tray is integral with the cover and is provided stability by the motor shell. The tray reduces the likelihood that tools and accessories will be lost or damaged due to improper storage.

DETAIL DESCRIPTION OF THE INVENTION

Figure 1:
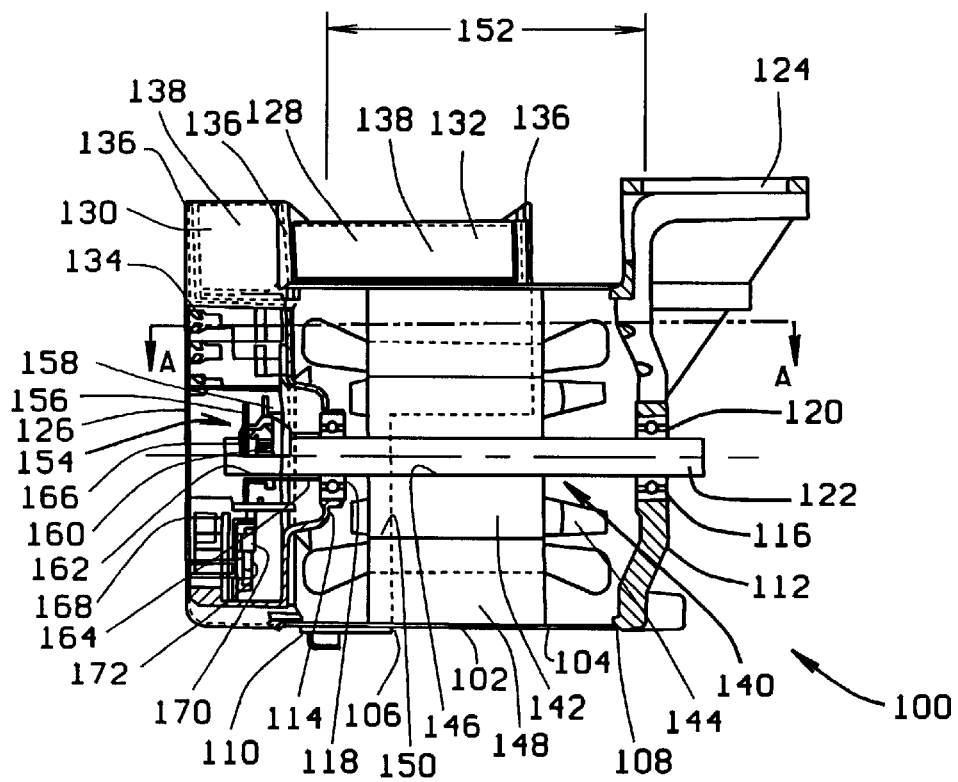
FIG. 1 is a side view of an electric motor assembly according to one embodiment of the present invention.

FIG. 1 is a side view of an electric motor assembly 100 in accordance with one embodiment of the present invention. Electric motor assembly 100 includes a housing 102 having a shell 104 with a first end 106, a second end 108, a first end shield 110, and a second end shield 112. First and second end shields 110, 112 are mounted to first and second shell ends 106, 108, respectively. First and second end shields 110, 112 include bearing supports 114, 116 respectively and have bearings 118, 120, respectively, therein. A rotor shaft 122 is rotatably supported by bearings 118, 120. Second end shield 112 also includes a flange 124 for supporting a compressor (not shown) that is driven by rotor shaft 122.

Motor assembly 100 also includes a cover 126 and a tray 128. Cover 126 is attached to first end shield 112 and forms an enclosure with first end shield 112. Tray 128 includes a first portion 130 and a second portion 132. Tray first portion 130 is connected to cover 126 and tray second portion 132 is substantially perpendicular to cover 126. In one embodiment, tray first portion 130 is unitary with cover 126 and extends from a first end 134 of cover 126. Tray second portion 132 is unitary with tray first portion 130 and is secured to motor shell 104 with fasteners such as screws, bolts, or welding. In an alternative embodiment, tray first portion 130 is attached to cover 126 with, for example, screws or bolts. Alternatively, tray first portion 130 could be welded to cover 126.

Motor assembly 100 is typically used with an air compressor (not shown) which requires a variety of fittings and accessory tools (not shown). Tray 128 thus includes a plurality of walls, or dividers, 136 that form a plurality of compartments 138. Compartments 138 can be utilized to store the various fittings and accessory tools to keep them organized and prevent them from getting lost.

Motor assembly 100 further includes a rotor assembly 140 that includes rotor shaft 122 and a rotor core 142. Rotor core 142 includes a plurality of laminations (not shown) and end rings 144. Rotor core 142 has a bore 146 extending therethrough, and rotor shaft 122 extends through rotor core bore 146 and is fixedly attached to rotor core 142. Rotor shaft 122 is substantially straight and, in one embodiment, has a substantially uniform diameter. A stator 148 is mounted in housing 102, and includes start windings, run windings (not shown), and a stator bore 150. Rotor assembly 140 is positioned within the stator bore 150.

Rotor assembly 140 also includes a reduced bearing span 152, compared to the bearing span of known rotor assemblies, that aids in preventing deflection of rotor shaft 122 during heavy side loading. To provide this reduced bearing span, a centrifugal mechanism 154 is attached outboard of housing 102. Centrifugal mechanism 154 includes a push collar 156 and a plurality of arms 158. Arms 158 are connected to each other by at least one spring 160. Centrifugal mechanism 154 has a bore 162 therethrough that enables centrifugal mechanism 154 to be positioned onto rotor shaft 122. Centrifugal mechanism 154 is used to cut-out a start winding (not shown) when rotor shaft 122 reaches a pre-set rotational speed. At the pre-set rotational speed, arms 158 move outwardly from rotor shaft 122 which propels push collar 156 axially along rotor shaft 122. A spacer 164 is positioned on rotor shaft 122 between first end shield bearing 118 and centrifugal mechanism 154. In one embodiment, first end shield bearing 118 is adjacent spacer 164 which is adjacent centrifugal mechanism 154. A retaining ring 166 is positioned on rotor shaft 122 adjacent centrifugal mechanism 154. Retaining ring 166 is locked onto rotor shaft 122 and maintains centrifugal mechanism 154 in contact with spacer 164 which in turn is maintained in contact with first end shield bearing 118.

Motor assembly 100 still further includes a terminal board 168 which includes a switch 170 having an actuating lever 172. Switch 170 is electrically connected to a start capacitor (not shown) which is electrically connected to the start windings (not shown). Centrifugal switch 170 is also electrically connected to a run capacitor (not shown) which is electrically connected to the run windings (not shown). The enclosure formed by cover 126 and first end shield 110 form an enclosure that houses centrifugal mechanism 154 and terminal board 168. When cover 126 is attached to first end shield 110, centrifugal mechanism 154 is positioned adjacent switch 170. In one embodiment, when push collar 156 moves axially, due to rotor shaft 122 reaching a pre-set rotation speed, actuating lever 172 is actuated. The actuation of lever 172 cuts out the start capacitor which de-energizes the start winding circuit (not shown).

Figure 2:
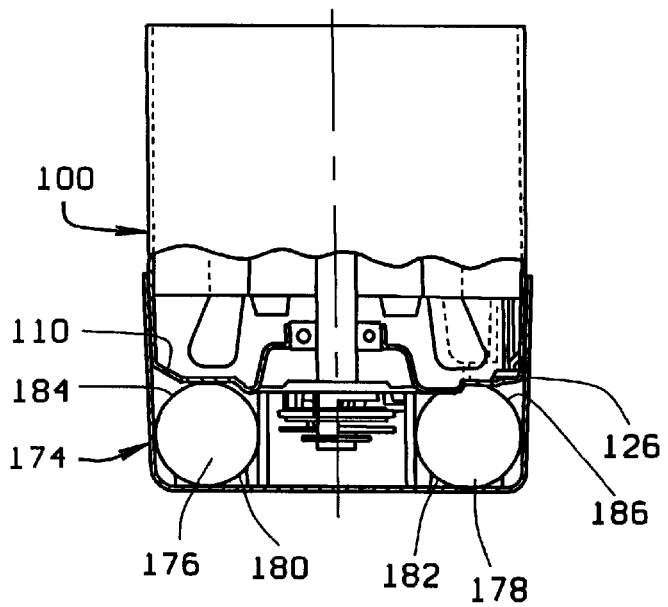
FIG. 2 is a partial cross section of the electric motor shown in FIG. 1 along line AA.

FIG. 2 is a partial cross section view of a cover assembly 174 mounted to end shield 110 of motor assembly 100. Cover assembly 174 includes cover 122, a start capacitor 176, a run capacitor 178, and terminal board (not shown). Start capacitor 176 is positioned in a first capacitor support 180 and run capacitor 178 is positioned in a second capacitor support 182. Start capacitor 176 and run capacitor 178 are contained within a first capacitor case 184 and a second capacitor case 186, respectively. In one embodiment, capacitor cases 184, 186 are fabricated from UL94-5V material which is relatively inexpensive and satisfies flammability requirements. UL94-5V material is commercially available from General Electric Company, Pittsfield, Mass., in Noryl HS2000X.

Figure 3:
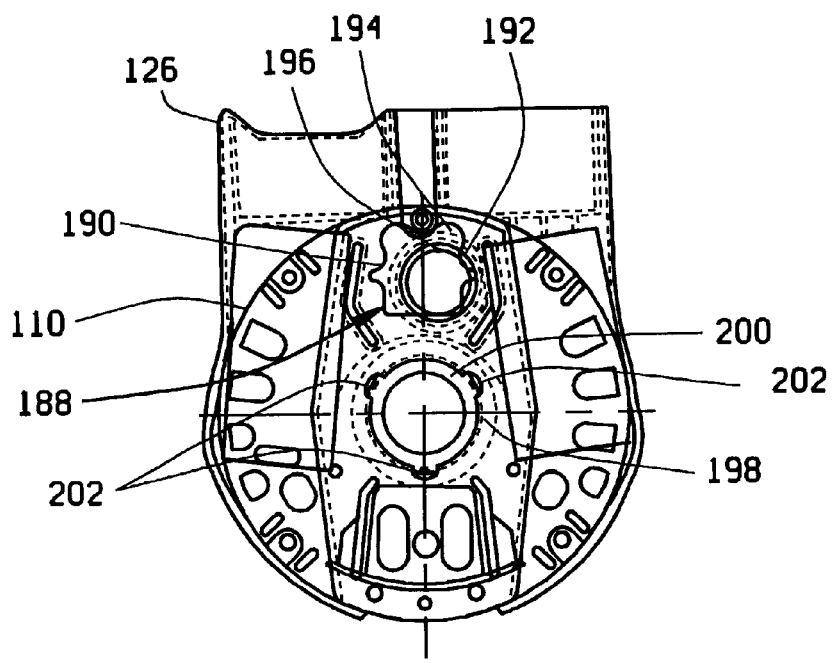
FIG. 3 is a face view of an end shield for the electric motor assembly shown in FIG. 1.

FIG. 3 is a face view of end shield 110 including cover 126, an overload 188 and an overload bracket 190. Overload bracket 190 includes a connecting portion 192 and at least two legs (not shown). End shield 110 includes at least one opening 194 through which overload 188 extends. Overload 188 extends at least partially through opening 194 and is held in position in end shield 110 by overload bracket 188. The legs extend at least partially into opening 194 and engage first end shield 110 which maintains overload 188 in position. Cover 122 is positioned over overload 188 and overload bracket 190. A cap 196 in cover 122 is then positioned above overload bracket 190.

FIG. 3 further illustrates a load washer 198 including a ring 200 and a plurality of legs and snaps (not shown). The legs extend at least partially into a plurality of openings 202 and engage first end shield 110 thereby attaching load washer 198 to first end shield 110. In one embodiment, load washer 198 includes three legs, each having one snap.

Figure 4:
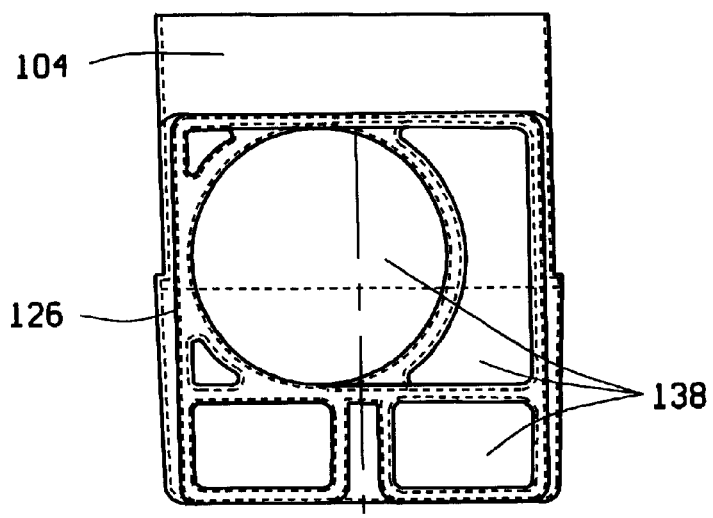
FIG. 4 is a top view of an accessories tray for the electric motor assembly shown in FIG. 1.

FIG. 4 is a top view of tray 128 illustrating compartments 138. Compartments 138 are of different shapes and sizes to accommodate the variety of items that may be placed within them. In one embodiment, tray 128 is fabricated from Noryl HS2000X as an integral part, or from a lower grade Polypropylene as a separate attached part. Tray 126 is connected to motor shell 104 by fasteners (not shown) such as bolts, screws, or pins. Alternatively, tray 126 could be connected to shell 104 by welding or glue. Compartments 138 can be shaped as circles, squares, triangles, or other shapes. Additionally, dividers 136 can be of different heights to provide different degrees of separation between adjacent compartments. In one embodiment, dividers 136 have a height of about one and a half inches. One or more lids (not shown) could be provided to cover one or more compartments 138. The lids could be hinged or friction fitted onto dividers 136. The lids would provide additional security for storage in applications where a high vibration is presetn, e.g., an air compressor. Tray 126 could also include one or more hooks, loops, or reels (not shown) for holding additional accessories. The hooks, loops, or reels could be attached to dividers 136 of tray 126.

Electric motor assembly 100 includes an integrated tray 126 for storage and organization of tools and accessories. The tray provides a convenient storage space for the tools and accessories. The cost of the tray is minimal thus providing a cost effective and convenient space for storing accessories that may be utilized with the electric motor or air compressor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An electric motor assembly comprising:
   a motor housing comprising a shell with first and second ends, a first end shield mounted to said first shell end, and a second end shield mounted to said second shell end, said first and second end shields comprising bearing supports having bearings therein, a cover attached to said second end shield, a tray extending from said cover and including at least one compartment exterior to said second end shield;
   a stator mounted in said housing and comprising a bore therethrough; and
   a rotor comprising a rotor core having a bore therethrough and a substantially straight shaft extending through said rotor core bore, said rotor rotatably mounted in said housing and extending through said stator bore, said shaft rotatably supported by said bearings.

2. An electric motor assembly in accordance with claim 1 wherein said cover and said second end shield form an enclosure, said tray unitary with said cover.

3. An electric motor assembly in accordance with claim 1 wherein said tray includes a plurality of compartments.

4. An electric motor assembly in accordance with claim 1 further comprising a centrifugal mechanism and a spacer, said centrifugal mechanism and said spacer having a bore therethrough, said shaft extending through said centrifugal mechanism and said spacer, said second end shield bearing positioned between said centrifugal mechanism and said rotor, said spacer positioned between said centrifugal mechanism and said second end shield bearing.

5. An electric motor assembly in accordance with claim 1 wherein said cover comprises first and second capacitor supports and a centrifugal switch.

6. An electric motor assembly in accordance with claim 5 further comprising a start capacitor positioned in said first capacitor support and a run capacitor positioned in said second capacitor support, said centrifugal switch electrically connected to said start capacitor and said run capacitor.

7. A cover assembly for an electric motor including a motor housing including a shell with first and second ends, a first end shield at said first shell end, and a second end shield at said second shell end, said first and second end shields comprising bearing supports having bearings therein, said cover assembly comprising:

a cover comprising a tray comprising at least one compartment, said cover configured to connect to the second end shield.

8. A cover assembly in accordance with claim 7 wherein said tray further comprises a first portion and a second portion, said first portion connected to said cover, said second portion connected to said first portion and extending substantially perpendicular to said cover.

9. A cover assembly in accordance with claim 8 wherein said tray is unitary with said cover.

10. A cover assembly in accordance with claim 8 wherein said tray comprises a plurality of compartments, at least one of said compartments dimensioned differently from another of said compartments.

11. A cover assembly in accordance with claim 8 wherein said cover comprises first and second capacitor supports.

12. A cover assembly in accordance with claim 8 further comprising a centrifugal switch connected to said cover.

13. A cover assembly in accordance with claim 12 further comprising a start capacitor positioned in a first capacitor support and a run capacitor positioned in a second capacitor support, said centrifugal switch electrically connected to said start capacitor and said run capacitor.

14. A cover assembly in accordance with claim 13 wherein said centrifugal switch includes an actuating lever configured to be actuated by a centrifugal mechanism, wherein actuation of said switch cuts out said start capacitor.

15. A cover assembly in accordance with claim 7 wherein said tray is connected to the motor shell.

16. A method for assembling an electric motor assembly including a motor housing having a shell with first and second ends, said method comprising the steps of:

mounting a stator within the housing, the stator including a bore;

positioning a rotor within the stator bore;

mounting a first end shield to the shell first end, the rotor extending through an opening in the first end shield;

mounting a second end shield to the shell second end, the rotor extending through an opening in the second end shield;

connecting a cover to the first end shield, the cover including a tray having at least one compartment.

17. A method in accordance with claim 16 wherein said step of connecting a cover comprises the step of connecting the tray to the motor shell.

18. A method in accordance with claim 16 wherein said step of connecting a cover comprises the steps of:

connecting a first portion of the tray to the first end shield; and mounting a second portion of the tray to the motor shell, the tray including a plurality of compartments having a variety of sizes and shapes.

19. A method in accordance with claim 16 wherein said step of connecting a cover comprises the step of connecting the cover to form an enclosure with the first end shield.

20. A method in accordance with claim 19 further comprising the step of positioning a centrifugal mechanism on a rotor shaft within the enclosure.

21. A method in accordance with claim 20 wherein said step of connecting a cover comprises the steps of:

attaching at least one capacitor to the cover; and electrically connecting the capacitor to the centrifugal mechanism.

* * * * *